United States Patent [19]
Gregory et al.

[11] Patent Number: 5,869,627
[45] Date of Patent: Feb. 9, 1999

[54] STABILISED DYE COMPOSITION

[75] Inventors: Peter Gregory, Bolton, Great Britain; Ronald Wynford Kenyon, Dorset; Paul Wight, Manchester, both of United Kingdom

[73] Assignee: Zeneca Limited, London, United Kingdom

[21] Appl. No.: 981,645

[22] PCT Filed: Jun. 28, 1996

[86] PCT No.: PCT/GB96/01561

§ 371 Date: Jan. 8, 1998

§ 102(e) Date: Jan. 8, 1998

[87] PCT Pub. No.: WO97/03132

PCT Pub. Date: Jan. 30, 1997

[30] Foreign Application Priority Data

Jul. 13, 1995 [GB] United Kingdom ................ 9514386

[51] Int. Cl.$^6$ ................ C09B 67/24; C09B 67/26; C09B 31/08
[52] U.S. Cl. ................ 534/576; 534/797; 8/527; 8/607; 8/620; 8/614; 8/616
[58] Field of Search ................ 534/576, 797; 8/527, 607, 620

[56] References Cited

U.S. PATENT DOCUMENTS

| | | | |
|---|---|---|---|
| 4,400,321 | 8/1983 | Linhart et al. | 534/576 X |
| 4,765,797 | 8/1988 | Hahnke et al. | 8/654 |

FOREIGN PATENT DOCUMENTS

| | | |
|---|---|---|
| 057 789 | 8/1982 | European Pat. Off. |
| 356 080 | 2/1990 | European Pat. Off. |
| 96/13553 | 5/1996 | WIPO |

OTHER PUBLICATIONS

Patent Abstracts of Japan, vol. 006, No. 261 (C–141), Dec. 21, 1982 & JP,A,57 153053—Sep. 21, 1982, see abstract.

Primary Examiner—Fiona T. Powers

Attorney, Agent, or Firm—Pillsbury Madison & Sutro LLP

[57] ABSTRACT

A composition of a water-soluble bis-azo dye of the Formula (1) and an oxidising agent.

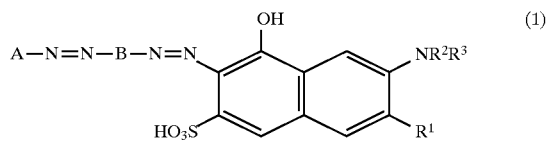

wherein

A is optionally substituted phenyl or optionally substituted naphthyl;

B is optionally substituted phenylene or optionally substituted naphthylene;

$R^1$ is H or sulpho;

$R^2$ is H, optionally substituted alkyl, optionally substituted aryl or optionally substituted acyl;

$R^3$ is H, optionally substituted aryl, optionally substituted alkyl or a group, -D-E, D is optionally substituted $C_{2-6}$-alkylene; and E is a group of the Formula (1a):

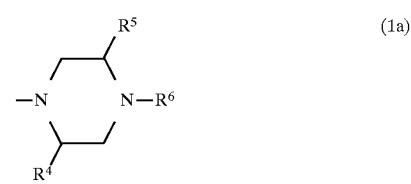

$R^4$ & $R^5$ each independently is H or optionally substituted alkyl; and $R^6$ is H, optionally substituted alkyl, optionally substituted aryl or optionally substituted acyl.

7 Claims, No Drawings

STABILISED DYE COMPOSITION

This application is A371 of PCT/ GB96/01561 filed Jun. 28, 1996 which designated U.S.

This invention relates to a bis-azo dye composition containing a stabilising agent to protect the dye against decomposition.

It has been found that certain bis-azo dyes, especially such dyes containing carboxy and/or piperazino groups, are useful as colorants of inks for ink jet printing onto paper substrates because they combine good solubility in an aqueous ink medium with good water-fastness on the paper substrate. However, it has also been found that such dyes are susceptible to decomposition, especially when they are stored at an elevated temperature (e.g. above 50° C.) in a de-aerated solution in such a way as to prevent contact with oxygen, e.g. in an ink jet printing cartridge. It is believed that this decomposition is due to minor amounts of impurities and/or by-products of the dye preparation process which are difficult to remove by commercial purification methods and it has been found that such decomposition can be reduced by the addition of an oxidising agent.

According to the present invention there is provided a composition of a water-soluble bis-azo dye of the Formula (1) and an oxidising agent,

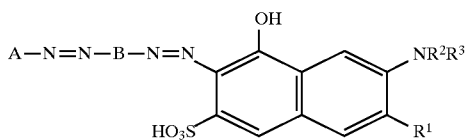

wherein

A is optionally substituted phenyl or optionally substituted naphthyl;

B is optionally substituted phenylene or optionally substituted naphthylene;

$R^1$ is H or sulpho;

$R^2$ is H, optionally substituted alkyl, optionally substituted aryl or optionally substituted acyl;

$R^3$ is H, optionally substituted aryl, optionally substituted alkyl or a group, -D-E;

D is optionally substituted $C_{2-6}$-alkylene; and

E is a group of the Formula (1a):

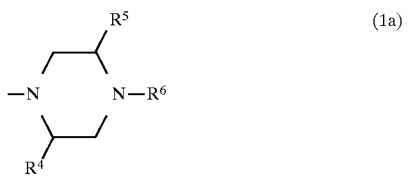

$R^4$ & $R^5$ each independently is H or optionally substituted alkyl; and $R^6$ is H, optionally substituted alkyl, optionally substituted aryl or optionally substituted acyl.

It is preferred that the compound of Formula (1) has at least as many carboxy (—COOH) groups as sulpho (—SO$_2$OH) groups, more preferably not more than 2 —SO$_2$OH groups and especially 1 or 2 —SO$_2$OH groups. It is preferred that the compound of Formula (1) has from 1 to 3, and especially 2 or 3—COOH groups. Overall it is preferred that the compound of Formula (1) contains a total of from 2 to 5 —COOH and —SO$_2$OH groups and especially 3 or 4 such groups.

When A is substituted it preferably carries from one to three, especially one or two substituents selected from:

carboxy; sulpho; —OH; —CN; —NO$_2$; —PO(OH)$_2$; —B(OH)$_2$;

halo, preferably —Cl;

alkyl, preferably $C_{1-4}$-alkyl and especially methyl;

alkoxy, preferably $C_{1-4}$-alkoxy and especially methoxy;

—COOR$^7$, —SO$_2$R$^7$ or —COR$^7$, wherein R$^7$ is optionally substituted $C_{1-4}$-alkyl or optionally substituted aryl;

optionally substituted amino, preferably —NQ$^1$Q$^2$ wherein Q$^1$ and Q$^2$ are each independently H or optionally substituted alkyl or optionally substituted aryl, or Q$^1$ and Q$^2$, taken together with the N atom to which they are attached, form an optionally substituted 5- or 6-membered ring; and acylamino, especially alkyl- or aryl-carbonylamino or alkyl- or aryl-sulphonylamino, more especially $C_{1-4}$-alkyl-CONH—or $C_{1-4}$-alkyl-SO$_2$NH—.

It is further preferred that A carries at least one, and more preferably, two carboxy groups. It is also preferred that $R^1$ is H.

It is especially preferred that A is carboxyphenyl or carboxynaphthyl, especially 3- or 4-carboxyphenyl group or carboxyphenyl having one or two further substituents, especially one, selected from carboxy, sulpho, methyl, methoxy and chloro. Examples of optionally substituted phenyl and naphthyl groups represented by A are 4-carboxyphenyl, 3-carboxy-phenyl, 3,5-dicarboxyphenyl, 3,4-dicarboxyphenyl, 2-methyl-5-carboxy-phenyl, 2-sulpho-5-carboxyphenyl, 4-carboxynaphth-1-yl, 5-carboxynaphth-1-yl, 6-carboxynaphth-1-yl, 7-carboxynaphth-1-yl, 6-carboxynaphth-2-yl and 1-sulpho-6-carboxynaphth-2-yl.

When $R^2$, $R^3$, $R^6$, $R^7$, $Q^2$ or $Q^2$ is or includes optionally substituted alkyl it is preferably $C_{1-4}$-alkyl, such as methyl, ethyl, propyl or butyl; optionally substituted by $C_{1-4}$-alkoxy, especially methoxy or ethoxy; halo, especially chloro, OR$^8$; COOR$^8$ or —SO$_2$OH in which R$^8$ is H, $C_{1-4}$-alkyl or phenyl. When $R^2$, $R^3$, $R^6$, $R^7$, $Q^1$ or $Q^2$ is or includes optionally substituted aryl this is preferably phenyl, optionally substituted, preferably in the 2-, 3-, 4-, 2,4-, 3,4- or 3,5- positions, by a group or groups selected from $C_{1-4}$-alkyl, $C_{1-4}$-alkoxy, halo, OH, NH$_2$, CN, NO$_2$, —COOH and —SO$_2$OH. When Q$^1$ and Q$_2$, taken together with the N atom to which they are attached, form an optionally substituted 5- or 6-membered ring this is preferably a piperazine, morpholine or piperidine ring optionally substituted by any of the substituents mentioned above for Q$^1$ where this is alkyl.

When B is optionally substituted naphthylene, this is preferably naphth-1,4-ylene or naphth-1,4-ylene carrying one or two —COOH or —SO$_2$OH groups in the 6- and/or 7-positions. However, where the naphthylene contains a single substituent, it is generally more convenient to employ a mixture of isomeric compounds of Formula (1) in one of which the —COOH or —SO$_2$OH (in the naphth-1,4-ylene group represented by B) is in the 6-position and in the other it is in the 7-position.

When B is substituted phenylene it is preferably of the formula (2)

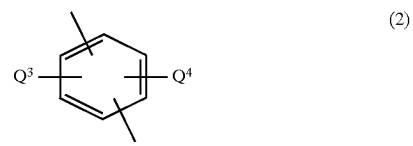

wherein $Q^3$ is NQ$^5$Q$^6$, optionally substituted alkyl or optionally substituted alkoxy;

$Q^4$ is H, halo, —COOH, —SO$_2$OH, optionally substituted alkyl, optionally substituted alkoxy, or optionally substituted alkylthio;

$Q^5$ is H or alkyl; and $Q^6$ is H, alkyl or acyl.

Where $Q^3$ is NQ$^5$Q$^6$, $Q^5$ is preferably H or C$_{1-4}$-alkyl, such as methyl or ethyl and more especially, H. Where $Q^6$ is alkyl this is preferably C$_{1-4}$-alkyl. Where $Q^6$ is acyl it is preferably NH$_2$CO—, R$^9$CO— or R$^9$SO$_2$—, wherein R$^9$ is optionally substituted C$_{1-4}$-alkyl, especially methyl, or optionally substituted aryl, especially phenyl. Where $Q^6$ is other than H, and especially where it is acyl, $Q^5$ is preferably H.

Where $Q^3$ is optionally substituted alkyl or alkoxy, it is preferably C$_{1-4}$-alkyl such as methyl or ethyl or C$_{1-4}$-alkoxy such as methoxy or ethoxy. It is especially preferred that $Q^3$ is methyl or methoxy.

It is preferred that $Q^4$ is C$_{1-4}$-alkyl, C$_{1-4}$-alkoxy, C$_{1-4}$-alkylthio, Cl, H, COOH or, SO$_2$OH, more preferably C$_{1-4}$-alkyl, such as methyl or ethyl, or C$_{1-4}$-alkoxy, such as methoxy or ethoxy. It is especially preferred that $Q^4$ is H, methyl or methoxy.

When $R^2$ or $R^6$ is optionally substituted acyl this is preferably alkyl or aryl carboxy, or alkyl or aryl sulphonyl in which the alkyl or aryl groups may be substituted as hereinbefore described.

It is preferred that $R^2$ and $R^6$ each independently is H, C$_{1-4}$-alkyl, C$_{1-4}$-alkylcarbonyl, C$_{1-4}$-alkoxycarbonyl or phenylcarbonyl. Examples of such groups are methyl, ethyl, acetyl, methoxycarbonyl, ethoxycarbonyl and benzoyl. It is especially preferred that $R^2$ is H or C$_{1-4}$-alkyl and $R^6$ is H, C$_{1-4}$-alkyl, C$_{1-4}$-alkyl-carbonyl, C$_{1-4}$-alkoxycarbonyl or benzoyl and more especially that $R^2$ and $R^6$ are both H. It is preferred that $R^4$ and $R^5$ are each independently H or C$_{1-4}$-alkyl and more especially that both are H.

When $R^4$ or $R^5$ is substituted each substituent is preferably selected from —COOH, —COOR$^8$, —SO$_2$OH, OH, C$_{1-4}$-alkoxy and halo, especially chloro. It is however preferred that $R^4$ and $R^5$ are unsubstituted.

Where D is optionally substituted C$_{2-6}$-alkylene th substituents may be selected from those described above for A.

The C$_{2-6}$-alkylene group represented by D is preferably a C$_2$- or C$_3$-alkylene group, especially ethylene, isopropylene or n-propylene, and is preferably unsubstituted.

A preferred compound of Formula (1) is where A is optionally substituted carboxyphenyl wherein any further substituent is selected from —COOH, —SO$_2$OH, methyl, methoxy, chloro and hydroxy, especially 3- or 4-carboxyphenyl or 3,4- or 3,5-dicarboxyphenyl; each of R$^1$ and R$^6$ is H; D is ethylene or propylene; and E is piperazinyl. An especially preferred compound of Formula (1) is where A is 3- or 4-carboxyphenyl or 3,4- or 3,5-dicarboxyphenyl; B is 2,5-dimethoxyphen-1,4-ylene, 2-methoxy-5-methylphen-1,4-ylene, 2-aminophen-1,4-ylene, 2-amino-5-methoxyphen-1,4-ylene, naphth-1,4-ylene or 7-sulphonaphth-1,4-ylene, D is eth-1,2-ylene, prop-1,2-ylene, or prop-1,3-ylene; E is piperazin-1-yl and each of R$^1$, R$^2$, R$^4$, R$^5$ and R$^6$ is H.

The oxidising agent is conveniently selected from halooxides, such as periodates, iodates, chlorates and chlorites; persulphates; peroxides, peracids; percarbonates in the free acid or salt forms and especially in the form of alkali metal such as Na or K or ammonium salts and quinones. Examples of such acids and salts are KIO$_4$, KIO$_3$, NaOCl, (NH$_4$)$_2$S$_2$O$_8$, 3-chloroperbenzoic acid, peracetic acid, perbenzoic acid, K$_2$S$_2$O$_8$ and mixed salts such as 2KHSO$_5$.KHSO$_4$.K$_2$SO$_4$ (available as "oxone" from Aldrich Chemical Co) and tetrachlorobenzoquinone.

To give a reasonable level of protection against decomposition of the dye, the composition preferably contains at least 1% of oxidising agent by weight with respect to the dye and in order to minimise the risk of oxidative decomposition of the dye by the oxidising agent the composition preferably does not contain more than about 10% of the oxidising agent. However, more preferably the composition contains from 3% to 7% and especially around 4% to 5% oxidising agent, all by weight with respect to the dye. The composition may be dry and contain only the dye and oxidising agent or it may contain other ingredients such as liquid media and/or solvents preservatives and formulating agents which are conventionally added to an ink. The composition is preferably in the form of a solution of the dye and oxidising agent in an aqueous medium especially a mixture of water and water miscible liquids such as alcohols, glycols etc such liquid media are described more fully in EP 559,310A which may also contain any or all the other ingredients normally present in an ink, especially an ink jet printing ink.

According to a further feature of the present invention there is provided a process for reducing decomposition of a composition comprising a water-soluble bis azo dye of Formula (1) comprising treating the composition with an oxidising agent.

According to a further feature of the present invention there is provided the use of an oxidising agent to reduce decomposition in a composition comprising a water soluble bis azo dye of Formula (1).

The invention is further illustrated by the following examples in which all parts and percentages are by weight unless otherwise indicated.

EXAMPLE 1

A 5% solution of a dye of Formula

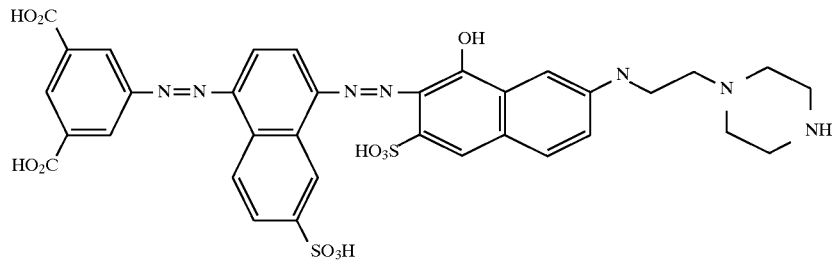

in water was prepared. Two portions (50ml) of this solution were placed in 60 ml glass bottles (marked A & B) and 0.1g of KIO$_4$ added to bottle A and thoroughly mixed with the solution therein. A sample from both bottles was analysed by TLC. Both bottles were then sealed and held at 70° C. for 7 days. After breaking the seals, both solutions were analysed by TLC and for colour strength (O.D.) with the following results

| Solution | TLC Analysis | Optical Density |
| --- | --- | --- |
| Dye + KIO$_4$ | No change | −10% |
| Dye | No Dye remaining | −100% |

These results indicate that the addition of the periodate solution preserves Dye 1 against thermal degradation.

EXAMPLE 2

The procedure of Example 1 was repeated except that the following dye was used:

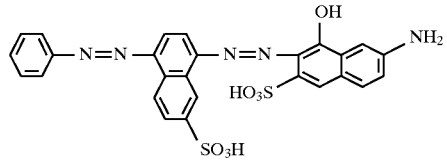

| Solution | Optical Density |
| --- | --- |
| Dye + KIO$_4$ | <−1% |
| Dye | −10% |

We claim:

1. A composition of a water-soluble bis-azo dye of the Formula (1) and an oxidising agent,

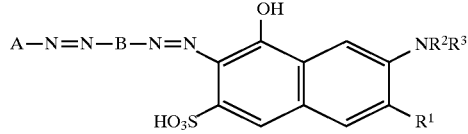

wherein
A is optionally substituted phenyl or optionally substituted naphthyl;
B is optionally substituted phenylene or optionally substituted naphthylene;
$R^1$ is H or sulpho;
$R^2$ is H, optionally substituted alkyl, optionally substituted aryl or optionally substituted acyl;
$R^3$ is a group of the formula -D-E;
D is optionally substituted $C_{2-6}$-alkylene; and
E is a group of the Formula (1a):

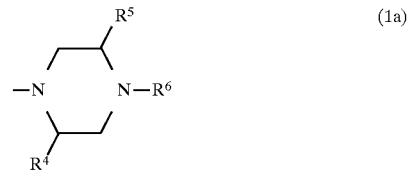

$R^4$ & $R^5$ each independently is H or optionally substituted alkyl; and
$R^6$ is H, optionally substituted alkyl, optionally substituted aryl or optionally substituted acyl.

2. A composition according to claim 1 wherein:
A is optionally substituted carboxyphenyl;
$R^1$ and $R^6$ are each H;
D is ethylene or propylene; and
E is piperazinyl.

3. A composition according to claim 1 wherein:
A is 3-carboxyphenyl, 4-carboxyphenyl, 3,4-dicarboxyphenyl or 3,5-dicarboxyphenyl;
B is 2-methoxy-5-methylphen-1,4-ylene, 2-aminophen-1,4-ylene, 2-amino-5-methoxyphen-1,4-ylene, naphth-1,4-ylene or 7-sulphonaphth-1,4-ylene;
D is eth-1,2-ylene, prop-1,2-ylene, or prop-1,3-ylene;
E is piperazin-1-yl; and
each of $R^1$, $R^2$, $R^4$, $R^5$ and $R^6$ is H.

4. A composition according to any one of claims 1 to 3 in which the oxidising agent is selected from a halo-oxide, persulphate, peroxide, peracid, percarbonate in a free acid or salt form and quinone.

5. A composition according to any one of claims 1 to 4 in which the oxidising agent is selected from an alkali metal or ammonium periodate, iodate, chlorite, chlorate, persulphate, peroxide and percarbonate or is tetrachlorobenzoquinone.

6. A composition according to any one of claims 1 to 5 in which the composition contains from 1% to 10% of oxidising agent.

7. A process for reducing decomposition of a composition comprising a water-soluble bis azo dye of Formula (1) comprising treating the composition with an oxidising agent.

* * * * *